(12) United States Patent
Hansen

(10) Patent No.: US 12,130,765 B2
(45) Date of Patent: Oct. 29, 2024

(54) SHARING COMMUNICATION LINES AMONG MULTIPLE BUSES

(71) Applicant: HEWLETT PACKARD ENTERPRISE DEVELOPMENT LP, Houston, TX (US)

(72) Inventor: Peter A. Hansen, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 71 days.

(21) Appl. No.: 18/045,219

(22) Filed: Oct. 10, 2022

(65) Prior Publication Data

US 2024/0119019 A1 Apr. 11, 2024

(51) Int. Cl.
*G06F 13/40* (2006.01)

(52) U.S. Cl.
CPC .. *G06F 13/4027* (2013.01); *G06F 2213/0016* (2013.01)

(58) Field of Classification Search
CPC .......................................................... G06F 1/26
See application file for complete search history.

(56) References Cited

U.S. PATENT DOCUMENTS

| | | | |
|---|---|---|---|
| 5,811,997 A * | 9/1998 | Chengson | H03K 19/018585 327/108 |
| 6,693,678 B1 * | 2/2004 | Tults | G06F 13/4291 348/901 |
| 9,411,772 B2 | 8/2016 | Jones | |
| 9,990,316 B2 | 6/2018 | Mishra et al. | |
| 10,095,891 B2 | 10/2018 | Hershman et al. | |
| 10,324,889 B2 | 6/2019 | Smith | |
| 10,380,061 B2 | 8/2019 | Suarez et al. | |
| 10,417,360 B2 | 9/2019 | Melmoth et al. | |
| 10,452,582 B2 | 10/2019 | Hershman et al. | |
| 10,691,807 B2 | 6/2020 | Hershman et al. | |
| 10,776,527 B2 | 9/2020 | Hershman et al. | |
| 10,819,364 B1 | 10/2020 | Suarez et al. | |

* cited by examiner

*Primary Examiner* — Henry Tsai
*Assistant Examiner* — Juanito C Borromeo
(74) *Attorney, Agent, or Firm* — Trop, Pruner & Hu, P.C.

(57) ABSTRACT

A process includes coupling a push-pull driver of a first bus device to a plurality of communication lines that are associated with a first bus to allow the first bus device to access the first bus using push-pull signaling. The process includes sharing a set of communication lines with the second bus. The sharing includes coupling an open drain driver of a second bus device to the set of communication lines to allow the second bus device to access the second bus using open drain signaling. The sharing includes using the set of communication lines in first time periods in which the first bus device accesses the first bus and using the set of communication lines in second time periods other than the first time periods in which the second bus device accesses the second bus. The sharing includes isolating a push-pull driver of the first bus device from the set of communication lines responsive to the second time periods.

21 Claims, 10 Drawing Sheets

SHARING COMMUNICATION LINES AMONG MULTIPLE BUSES

BACKGROUND

Electronic devices may communicate data using serial communications. With serial communication, electronic device A may serially transmit data to electronic device B sequentially, one bit at a time. Electronic devices may serially communicate data using a serial communication link, or bus. Characteristics (e.g., the number of communication lines and signaling protocols) of the bus may be governed by a standard, or specification.

DETAILED DESCRIPTION

Figure 1:
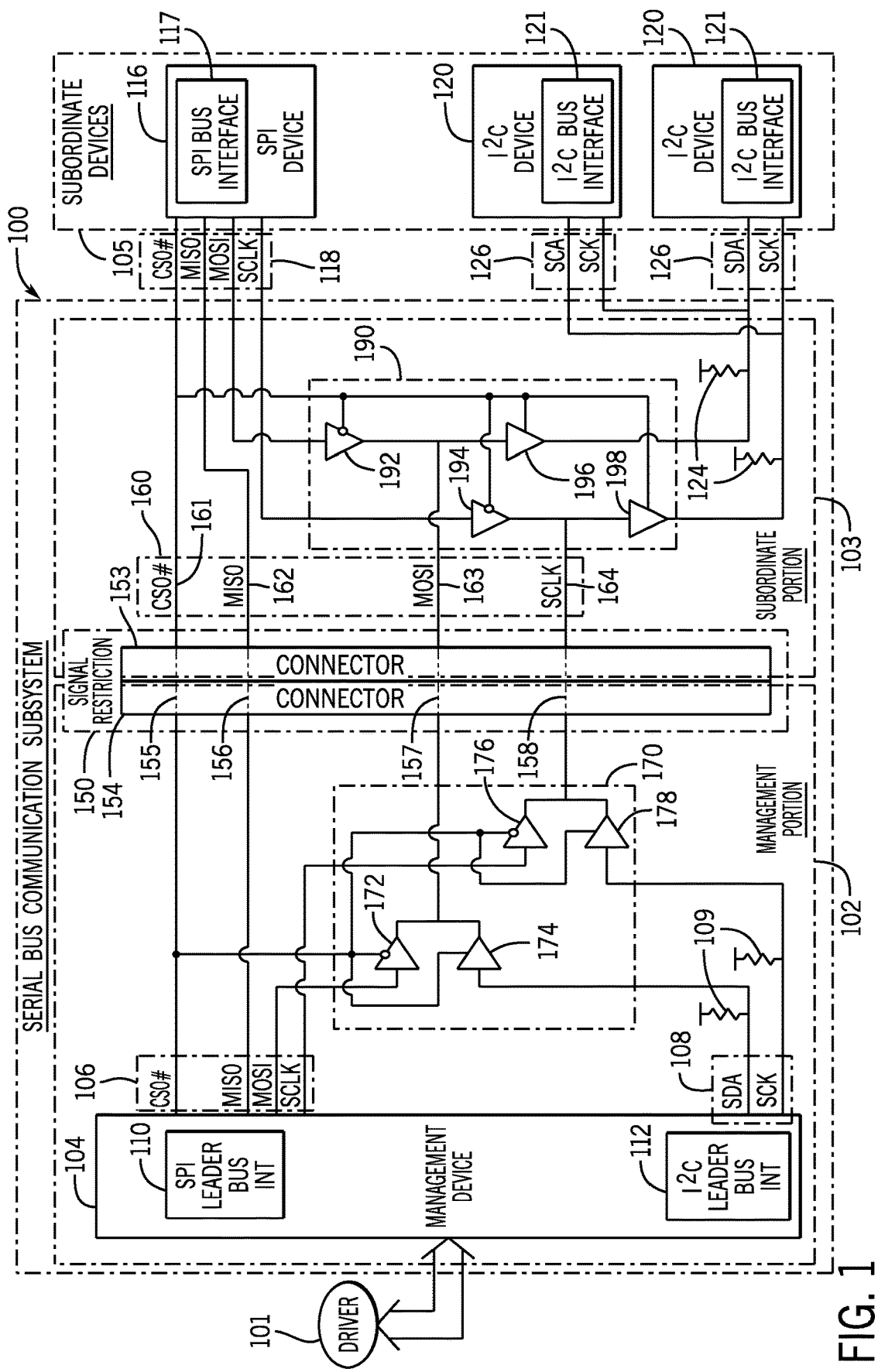
FIG. 1 is a schematic diagram of a serial bus communication subsystem that shares communication lines of a SPI bus with an $I^2C$ bus according to an example implementation.

Data may be serially communicated between electronic devices using any of a number of serial bus architectures. For example, a serial bus may be a synchronous bus in which a transmitted data stream is synchronized to a separate clock signal, or the serial bus may be an asynchronous bus in which the transmitted data stream contains synchronization fields. Some serial buses are constrained to half-duplex communication, which means that although device A can transmit data to device B and device B can transmit data to device A, data transmissions in both directions cannot occur simultaneously. Other serial buses allow full-duplex communication, which means that data may be transmitted simultaneously from device A to device B and from device B to device A.

A serial bus, in general, includes communication lines that are designated to communicate specific signals. Here, a "communication line" (or "line") refers to an electrically conductive path, which may include one or multiple of the following: a wire, a cable conductor, a connector pin, a connector socket, or a conductive trace (e.g., a trace of a circuit board substrate). A standard, or specification, for the serial bus defines various aspects, or characteristics, of the serial bus, such as the number of communication lines, the types of signals to be communicated on the communication lines, signaling protocols, the number of leader devices, the number of active follower devices, as well as other and/or different characteristics. Data may be communication between serial bus devices using data transfers. In this context, a "data transfer" (also called "bus transfer" or "transfer" herein) over a serial bus refers to the communication of data between devices by driving signals onto the serial bus and responding to signals on the serial bus according to a particular signaling protocol.

A computer system may have multiple serial buses that are associated with different serial bus specifications, or standards. As a more specific example, a rack-based computer system may have a chassis management controller that manages and controls components of the system, such as blade servers, network switches, power supplies, fans and other components. For purposes of allowing the chassis management controller to manage and control the components, the chassis management controller may communicate with serial bus devices of the components. For example, the serial bus devices may include Inter-Integrated Circuit ($I^2C$) devices and Serial Peripheral Interface (SPI) devices. The chassis controller may communicate with the serial bus devices using an $I^2C$ bus (for the $I^2C$ devices) and a SPI bus (for the SPI devices).

A computer system may have a physical signal barrier, or restriction, such as a connector, a backplane, a cable, or a region of a circuit board substrate, which places a constraint on the number of signals that may be communicated through the restriction. For example, for a rack-based computer system, a backplane connector of a chassis management controller may have a relatively limited number of connector terminals (e.g., pins or sockets). There may be a limit on the number of connector terminals due to such factors as size, complexity and/or cost constraints. This limit, in turn, may present challenges for routing bus communications through the backplane connector.

In accordance with example implementations, a bus communication subsystem, due to the features described herein, allows a set of communication lines (called the "shared set of communication lines" or "shared communication lines" herein) to be shared by multiple buses. In accordance with some implementations, the bus communication subsystem is a serial bus communication subsystem that has features to allow a set of communication lines to be shared by multiple serial buses. In accordance with example implementations that are described herein, a serial bus communication subsystem has features that allow the sharing of communication lines of a SPI bus with an $I^2C$ bus. In accordance with further implementations, a bus communication system may allow the sharing of communication lines of a SPI bus with a bus other than an $I^2C$ bus. In accordance with further implementations, a bus communication system may allow the sharing of communication lines of a bus other than a SPI bus with an $I^2C$ bus. In accordance with yet further implementations a bus communication system may allow the sharing of communication lines of buses other than SPI and $I^2C$ buses, such as an Improved $I^2C$ ($I^3C$) bus, a System Management Bus (SMB), a Controller Area Network (CAN) bus, an enhanced SPI (eSPI) bus, a FireWire bus, a Serial Attached Small Computer System Interface (SAS) bus, a Low Pin Count (LPC) bus, a Universal Serial Bus (USB), or other bus(es). Moreover, in accordance with further implementations, a bus communication subsystem may share communication lines among more than two buses.

The sharing of communication lines among buses reduces (e.g., minimizes) the total number of communication lines that are otherwise allocated for the buses, and this reduction in the number of communication lines may be beneficial for purposes of routing the multiple buses through a signal restriction. In accordance with example implementations, transfers using buses that share the communication lines are mutually exclusive. Stated differently, bus transfers for Bus A using the shared set of communication lines occur during first time intervals and bus transfers for Bus B using the shared set of communication lines occur at second time intervals different from the first time intervals. As described further herein, in accordance with example implementations, controlling which bus has the exclusive use of the shared communication lines may involve the use of a sharing control mechanism, such as, for example, a shared mutex object, a time-division multiplexer, or other sharing control mechanism.

As an example, in accordance with some implementations, two communication lines of a SPI bus are shared with an $I^2C$ bus, and the total number of communication lines (e.g., four communication lines) that are allocated for the $I^2C$ bus and the SPI bus is less than the sum of the $I^2C$ bus communication lines and SPI bus communication lines (e.g., six total communication lines) if the $I^2C$ and SPI buses were completely separate. This reduction in communication lines may be particularly beneficial for routing multiple the $I^2C$ bus and the SPI bus, through a signal restriction, such as a backplane connector.

A SPI bus is an example of a synchronous, full duplex serial bus. The SPI bus may be used to communicate data between a controller, or SPI leader device (also called a "management device" or a "main device"), and a SPI subordinate device (also called a "peripheral device," a "follower device" or a "subnode device"). As examples, a SPI leader device may be a central processing unit (CPU) package (or "socket") or microcontroller, which has a SPI interface. As another example, a SPI leader device may be a bridge that has a SPI interface that communicates with the SPI bus on behalf of one or multiple other entities (e.g., CPU processing cores, graphics processing cores (GPUs) and other entities) that are coupled to the bridge through one or multiple other bus interfaces (e.g., a Peripheral Component Interconnect express (PCIe), a low pin count (LPC) interface, a system bus interface, or other interface). The SPI subordinate device may be any of a number of different devices, which has a SPI interface, such as a sensor (e.g., a temperature sensor, an intrusion detection sensor, a fan speed sensor, or other sensor), a non-volatile memory device, a volatile memory device, an analog-to-digital converter (ADC), a digital-to-analog converter (DAC), a programmable logic device (PLD), or other device. In accordance with example implementations, the SPI bus may correspond to the SPI specification that is described in Application Note AN991/D entitled, "Using the Serial Peripheral Interface to Communicate Between Multiple Microcomputers," which was published in January 2002 (Rev. 1) by NXP Semiconductor.

In accordance with example implementations, the SPI bus has four unidirectional communication lines: a MOSI line, a MISO line, an SCLK line and a CS #line. The SPI leader device drives the SCLK line with a clock signal and asserts (e.g., drives to a logic zero level) the CS #line to select, or activate, a targeted SPI subordinate device so that the SPI subordinate bus may communicate with the SPI leader device. The SPI leader device drives the MOSI line to serially communicate bits of data from the SPI leader device to the SPI subordinate device in synchronization with edges (e.g., positive going, or rising, edges) of the clock signal. The SPI subordinate device drives the MISO line to serially communicate bits of data from the SPI subordinate device to the SPI leader device in synchronization with the edges of the clock signal.

The SPI bus is a full duplex communication bus, meaning that the data bit communications over the MOSI and MISO lines may occur simultaneously. For the case of multiple SPI subordinate devices, each SPI subordinate device has an associated CS #terminal. The SPI leader device may activate a single SPI subordinate device at a time by asserting (e.g., driving to a logic zero) the CS #line that corresponds to the SPI subordinate device.

For purposes of driving a communication line of the SPI bus, the SPI device has a corresponding push-pull driver. For example, the SPI interface of a SPI leader device may have push-pull drivers for the respective MOSI, SCLK and CS #communication lines, and the SPI interface for a SPI subordinate device may have a push-pull driver for the MISO line. In this context, a "push-pull driver" refers to a circuit that includes a first transistor that is activated (or "turned on") responsive to a first input logic level (e.g., a logic one) to pull the output of the circuit to a first logic level (e.g., a logic zero) and a second transistor that is activated responsive to a second input logic level (e.g., a logic zero) to push the output to a second logic level (e.g., a logic one).

A complementary metal oxide semiconductor (CMOS) inverter is an example of a push-pull driver. In accordance with example implementations, the CMOS inverter has a p-channel MOS (PMOS) transistor to couple a supply voltage to an output terminal of the CMOS inverter to "push" the supply voltage onto the output to cause the output to have a logic one level. Moreover, in accordance with example implementations, the CMOS inverter further has a n-channel MOS (NMOS) transistor to "pull" the output of the CMOS inverter to a logic zero level (e.g., ground). The manipulation of a signal of a communication line with a push-pull driver is referred to herein as "open drain signaling."

The $I^2C$ bus is an example of a synchronous, half duplex serial bus. The $I^2C$ bus may be used to communicate data between an $I^2C$ leader device and one or multiple $I^2C$ subordinate devices (also called "peripheral devices" or "follower devices" herein). In accordance with example implementations, the $I^2C$ bus is a multidrop bus, which means that all $I^2C$ devices are active at a given time and means that an $I^2C$ leader device may communicate with one or multiple $I^2C$ subordinate devices at any given time (depending on the type of transfer) without first activating the $I^2C$ subordinate device(s). The $I^2C$ bus also allows multiple leader devices to initiate transfers at different times. An $I^2C$ leader device refers to an $I^2C$ device that initiates a transfer on the $I^2C$ bus. An arbitration protocol defines how ownership of the $I^2C$ bus is acquired when multiple $I^2C$ leader devices contend for the $I^2C$ bus at the same time.

As examples, an $I^2C$ device may be a microcontroller, a bridge, a CPU package, a GPU package, sensor, a fuse circuit, an anti-fuse circuit, a general purpose input/output (GPIO) expander, or any other device that contains an $I^2C$ bus interface. In accordance with example implementations, the $I^2C$ bus may correspond to the $I^2C$ specification that is described in "I²C-Bus Specification and User Manual," which was published on Oct. 1, 2021 (Rev. 7.0) by NXP Semiconductor.

The I²C bus has two communication lines, which are bidirectional: an SDA line and an SCL line. I²C packets are communicated in corresponding transfers over the SDA line. An I²C packet for a given transfer to an I²C follower device may include an address of the I²C follower device, a register number of the I²C follower device and data. The SCL line communicates a clock signal, and communications on the SDA line are synchronized to edges (e.g., rising edges) of the clock signal.

For a given transfer, the I²C leader device drives the SCL line with the clock signal and drives the SDA line in synchronization with edges of the clock signal to communicate the address and register number for one or multiple targeted I²C follower devices. For a read transfer, a targeted I²C subordinate device responds by driving the SDA line in synchronization with edges of the clock signal to serially communicate data to the I²C leader device. For a write transfer, the I²C leader device drives the SDA line in synchronization with edges of the clock signal to serially communicate data to the targeted I²C subordinate device(s).

The I²C bus has an open drain architecture. More specifically, an I²C bus device contains open drain drivers that have respective outputs that are coupled to the SDA line and the SCL line. Moreover, the SDA line and the SCL line may be coupled by respective pullup resistors to a supply voltage. The open drain architecture allows the SDA and SCL lines to have respective logic one levels by default. In this context, an "open drain driver" refers to a circuit that includes a transistor that is activated, or turned on, responsive to a first input logic level (e.g., a logic one) to drive an output of the circuit to a first output logic level (e.g., a logic zero), and the transistor is deactivated, or turned off, responsive to a second input logic level (e.g., a logic zero) to cause the output to have a high impedance state (also referred to as allowing the output to "float").

An n-channel MOS (NMOS) inverter is an example of an open drain driver. In accordance with example implementations, the NMOS inverter has an NMOS transistor that has a drain terminal that serves as the output of the NMOS inverter. In accordance with example implementations, when the NMOS transistor is activated (e.g., activated due to a logic one being applied to the gate terminal of the NMOS transistor), the NMOS transistor pulls its drain terminal (the output) low, and when the NMOS transistor is deactivated (e.g., a logic zero is applied to the gate of the NMOS transistor), the drain of the NMOS transistor (and therefore, the output) provides a high impedance. The manipulation of a signal on a communication line with an open drain driver is referred to herein as "open drain signaling."

Because, in accordance with example implementations, the SDA line is configured to have a default logic level (e.g., a logic one), if all of the open drain drivers of the I²C bus devices are deactivated (or turned off), then the SDA line returns to the default logic level. Conversely, the open drain driver of a particular I²C bus device may be activated (or turned on) to drive the SDA line to the other, non-default logic level (e.g., a logic zero).

The open drain architecture of the I²C bus may be particularly beneficial for arbitration purposes when multiple I²C leader devices are vying for control of the I²C bus. The I²C bus protocol specifies, in accordance with example implementations, that an I²C leader may, for an idle I²C bus, drive the SDA line with signaling that represents a start condition for a particular transfer. In this way, other potential I²C leader devices may, from observing the SDA line, glean from the observed start condition than an I²C leader device has initiated a transfer and has ownership of the I²C bus. However, it is possible that a given I²C leader device may not observe the start condition. For example, an I²C leader device may come out of reset during an ongoing transfer, or an I²C leader device may have missed the generation of the start condition by another I²C leader device. As such, there may temporarily be two I²C leader devices initiating transfers on the I²C bus. Because of the open drain signaling, a first I²C leader device may, for example, recognize that there is a second I²C leader device by observing that the SDA line is not pulled high when the first I²C leader device releases the SDA line (to generate a logic one). Rather than being pulled to a logic one, the SDA line instead remains at a logic zero due to the SDA line being concurrently driven low by the second I²C leader device. Responsive to this observation, the first I²C leader device may then back-off the current transfer and initiate a transfer at a later time.

A challenge with sharing SPI communication lines with the I²C bus is that subordinate devices may malfunction due to the incompatible types of signaling that are used by the I²C and SPI buses. For example, an I²C subordinate device may, based on a logic one level of a shared communication line that serves as the SDA line, assume that the I²C bus is idle. However, instead of being idle, this shared communication line may instead, be currently used by a SPI device whose push-pull driver is driving the shared communication line to the logic one level.

In accordance with example implementations that are described herein, a serial communication subsystem shares a set of communication lines between an I²C bus and a SPI bus, and the serial bus communication subsystem isolates I²C bus devices from the shared communication lines when the I²C bus is not being used (e.g., when the shared communication lines are being used for SPI bus transfers). For example, in accordance with some implementations, two SPI communication lines of a SPI bus may be shared with an I²C bus, so that the two SPI lines are also used as the SDA and SCK lines of the I²C bus. Therefore, a total of four communication lines instead of six communication lines may be allocated for the I²C and SPI buses. This reduction in communication lines may be particularly beneficial for routing I²C and SPI bus communications through a signal restriction.

More specifically, in accordance with example implementations, a management device (e.g., a management interface of a chassis management controller) of the serial communication subsystem contains an I²C leader bus interface and a SPI leader bus interface. The I²C leader bus device and the SPI leader bus device may communicate with I²C and SPI subordinate devices (e.g., I²C and SPI devices that are part of blade servers, network switches, fans, power supplies, or other components) via a signal restriction (e.g., a connector, backplane fabric or other signal restriction). In accordance with example implementations, the management device controls which bus has exclusive use of the shared communication lines, resulting in first time intervals (or "times") in which two shared communication lines are exclusively used for SPI bus communications and second intervals (or "times") in which the two shared communication lines are exclusively used for I²C bus communications. For purposes of preventing the SPI buses' push-pull signaling from interfering with the I²C devices, the serial bus communication system includes coupling circuitry.

In accordance with example implementations, the coupling circuitry, during the first times in which the shared communication lines are being used exclusively for SPI communications, couples the SPI devices to the shared communication lines and isolates the I²C devices from the shared communication lines. Moreover, in accordance with example implementations, the coupling circuitry, during the second times in which the shared communication lines are being used exclusively for I²C communications, couples the I²C devices to the shared communication lines and isolates the SPI devices from the shared communication lines.

Referring to FIG. 1, as a more specific example, a serial bus communication subsystem 100 includes a management device 104 that includes a SPI leader bus interface 110 and an I²C leader bus interface 112. The management device 104, in general, communicates with subordinate devices 105 (which may also be referred to as "subordinate bus devices," "bus devices" or "devices") using synchronous serial communications. In accordance with example implementations, the subordinate devices 105 include one or multiple SPI devices 116 that communicate with the SPI leader bus interface 110 via a SPI bus and one or multiple I²C devices 120 that communicate with the I²C leader bus interface 112 via an I²C bus.

In accordance with example implementations, the I²C bus and the SPI bus are routed through a signal restriction 150. In general, the signal restriction 150 places a limit on the number of communication lines that may be routed through the restriction 150. This limit may be due to any of a number of factors, such as cost, layout constraints, cable sizes, complexity constraints, size constraints, connector standards, or other factors. As examples, the signal restriction 150 may correspond to a particular region of a circuit substrate (e.g., a motherboard), a cable, a connector, network fabric, backplane fabric or other constraint on the number of communication lines. In general, the signal restriction 150 partitions the serial bus communication subsystem 100 into a management portion 102 on a management side of the signal restriction 150 and a subordinate portion 103 on a subordinate device side of the signal restriction 150.

For the example implementation that is depicted in FIG. 1, the signal restriction 150 includes two mating physical connectors 153 and 154. As an example, the connectors 153 and 154 may be backplane connectors. For example, the connector 154 may be a male backplane connector that has connector socket terminals, and the connector 154 may be constructed to plug into the connector 153 to electrically and mechanically mate with the connector 153. The connector 153 may be, for example, a female backplane connector that includes connector pin terminals that receive corresponding connector socket terminals of the connector 154.

The connection of the connectors 153 and 154 provides, among other conductive paths, conductive paths 155, 156, 157 and 158, which correspond to a set 160 of SPI bus communication lines. More specifically, in accordance with some implementations, the set 160 of SPI communication lines includes a CS0 #selection line 160, an MISO line 161, an MOSI line 163 and an SCLK line 164, which correspond to the conductive paths 155, 156, 157 and 158, respectively.

In accordance with example implementations, the serial bus communication subsystem 100 shares communication lines of the SPI bus with the I²C bus. The sharing involves, in accordance with example implementations, assigning exclusive use of the shared communicated lines to either the I²C bus or the SPI bus. Accordingly, during first time intervals (called "SPI bus time intervals" herein) the shared communication lines may be exclusively assigned for SPI bus communications, and during second time intervals (called "I²C bus time intervals" herein) the shared communication lines may be exclusively assigned for I²C bus communications. In accordance with example implementations, the serial bus communication subsystem 100 isolates I²C devices from the shared set of communication lines during the SPI time intervals.

For the particular implementation that is depicted in FIG. 1, the shared set of SPI communication lines includes the MOSI line 163 and the SCLK line 164. During the SPI bus time intervals, the MOSI line 163 and the SCLK line 164 function, respectively, as dedicated SPI bus lines. During the I²C bus time intervals, the MOSI line 163 becomes the SDA line (the data line) of the I²C bus, and the SCLK line 164 becomes the SCK line (the clock line) of the I²C bus.

In accordance with further example implementations, the shared set of SPI communication lines may be a pair of the set 160 of SPI bus communication lines other than the MOSI line 163 and SCLK line 164. For example, in accordance with further implementations, the MISO line 162 and the MOSI line 163 may be shared with the I²C bus. As another example, in accordance with further implementations, the MISO line 162 and the SCLK line 164 may be shared with the I²C bus.

Regarding the subordinate devices 105, the SPI device 116, in accordance with example implementations, includes a SPI bus interface 117 that is coupled to SPI bus communication wires, or terminals 118, of the SPI device 116. The SPI bus communication terminals 118 include a CS0 #terminal, an MISO terminal, an MOSI terminal and an SCLK terminal. In accordance with example implementations, during SPI bus time intervals, a coupling circuit 190 of the subordinate portion 103 of the serial bus communication subsystem 100 couples the MOSI terminal 118 and the SCLK terminal 118 to the MOSI line 163 and the SCLK line 164, respectively. In accordance with example implementations, during I²C bus time intervals, the coupling circuit 190 decouples, or isolates, the MOSI terminal 118 and the SCLK terminal 118 from the MOSI line 163 and the SCLK line 164.

The I²C device 120, in accordance with example implementations, includes an I²C bus interface 121 that is coupled to I²C communication wires, or terminals 126, of the I²C device 120. The I²C bus communication terminals 126 includes an SDA terminal and an SCK terminal. In accordance with example implementations, during I²C bus time intervals, the coupling circuit 190 couples the SDA terminal 126 and the SCK terminal 126 to the MOSI line 163 and the SCLK line 164, respectively. In accordance with example implementations, during SPI bus time intervals, the coupling circuit 190 decouples, or isolates, the SDA terminal 126 and the SCK terminal 126 from the MOSI line 163 and the SCLK line 164.

As depicted in FIG. 1, in accordance with example implementations, the I²C bus communication terminals 126 of the I²C device 120 are coupled to respective pullup resistors 124. Therefore, the open drain architecture is preserved for the I²C bus interface 121 for both the SPI bus communication intervals (in which the I²C bus interface 121 is decoupled, or isolated from, the shared SPI communication lines) and the I²C bus time intervals (in which the I²C bus interface 121 is coupled to the shared SPI communication lines).

Regarding the management device 104, the SPI leader bus interface 110, in accordance with example implementations, is coupled to SPI bus communication wires, or terminals 106, of the management device 104. The SPI bus communication terminals 106 include a CS0 #terminal, an MISO terminal, an MOSI terminal and an SCLK terminal. In accordance with example implementations, during the SPI bus time intervals, a coupling circuit 170 of the management portion 102 of the serial bus communication subsystem 100 couples the MOSI terminal 106 and the SCLK terminal 106 to the MOSI line 163 and the SCLK line 164, respectively. In accordance with example implementations, during I²C bus time intervals, the coupling circuit 170 decouples, or isolates, the MOSI terminal 106 and the SCLK terminal 106 from the MOSI line 163 and the SCLK line 164.

The I²C bus leader bus interface 112, in accordance with example implementations, is coupled to I²C bus communication wires, or terminals 108, of the management device 104. The I²C bus communication terminals 108 include an SDA terminal and an SCK terminal. In accordance with example implementations, during I²C bus time intervals, the coupling circuit 170 couples the SDA terminal 108 and the SCK terminal 108 to the MOSI line 163 and the SCLK line 164, respectively. In accordance with example implementations, during SPI bus time intervals, the coupling circuit 170 decouples, or isolates, the SDA terminal 126 and the SCK terminal 126 from the MOSI line 163 and the SCLK line 164.

In accordance with example implementations, the coupling and decoupling by the coupling circuits 170 and 190 are controlled by the logical state of the CS0 #communication line 161. The logical state of the CS0 #communication line 161, in turn, is controlled by the SPI leader bus interface 110. In accordance with some implementations, the serial bus communication subsystem 100 defaults to the I²C bus and as such, by default, de-asserts the CS0 #communication line 160 (e.g., drives the CS0 #communication line 160 to a logic one level) to cause the coupling circuits 170 and 190 to couple the SDA and SCK terminals of the I²C bus interfaces 112 and 121 to the MOSI line 161 and SCLK line 162.

Responsive to an upcoming SPI bus time interval, the SPI leader bus interface 110 asserts (e.g., drives to a logic zero level) the CS0 #communication line 160. The coupling circuit 170 responds to the assertion of the CS0 #communication line 160 to isolate the I²C leader bus interface 112 from the MOSI line 163 and the SCLK line 164, and couple the SPI leader bus interface 110 to the MOSI line 163 and SCLK line 164, as described herein. The coupling circuit 190 responds to the assertion of the CS0 #communication line 160 to isolate the I²C bus interface 121 from the MOSI line 163 and the SCLK line 164, and couple the SPI bus interface 117 to the MOSI line 163 and SCLK line 164, as described herein.

In accordance with example implementations, when the SPI bus is not being used, the coupling circuit 170 responds to the de-asserted CS0 #communication line 160 to isolate the SPI leader bus interface 110 from the MOSI line 163 and SCLK line 164. The coupling circuit 190 responds to the de-assertion of the CS0 #communication line 160 to isolate the SPI leader bus interface 117 from the MOSI line 163 and the SCLK line 164. The coupling circuit 190 responds to the assertion of the CS0 #communication line 160 to isolate the SPI bus interface 117 from the MOSI line 163 and the SCLK line 164, and couple the I²C bus interface 121 to the MOSI line 163 and SCLK line 164, as described herein.

In accordance with example implementations, the coupling circuit 170 includes tri-state buffers 172, 174, 176 and 178, and the coupling circuit 190 includes tri-state buffers 192, 194, 196 and 198. Here, a "tri-state buffer" refers to a circuit that, when activated, or is turned "on," couples a pair of communication line segments (e.g., the MOSI terminal 118 and the MOSI communication line 163) together, and when deactivated, or turned "off," isolates the pair of communication lines from each other.

In accordance with some implementations, the tri-state buffer allows bidirectional signal flows between the connected communication line segments. As an example, in accordance with some implementations, the tri-state buffer may be a CMOS transmission gate (or "pass gate"). In accordance with example implementations, a CMOS transmission gate may include an NMOS transistor and a PMOS transistor, which have their respective drain-source and source-drain paths coupled in parallel. The gate terminal voltages of the NMOS transistor and PMOS transistor may receive complimentary logic signals.

For example, the tri-state buffer 174 may be a CMOS transmission gate. The CMOS transmission gate may respond to an asserted CS0 #communication line 161 to cause the NMOS transistor and PMOS transistor to conduct and allow signal communication through the CMOS transmission gate. The CMOS transmission gate may respond to a de-asserted CS0 #communication line 161 to turn off both the NMOS and PMOS transistor to block signal communication through the CMOS transmission gate.

As another example, the tri-state buffer 176 may a CMOS transmission gate, which operates in the opposite manner from tri-state buffer 174, as denoted by the circle, or logic NOT, appearing at the enable input of the tri-state buffer 176. The CMOS transmission gate may respond to a de-asserted CS0 #communication line 161 to cause the NMOS transistor and PMOS transistor to conduct and allow signal communication through the CMOS transmission gate. The CMOS transmission gate may respond to an asserted CS0 #communication line 161 to turn off both the NMOS and PMOS transistor to block signal communication through the CMOS transmission gate.

In accordance with some implementations, the management device 104 may be a communication interface or subsystem for a computer platform. As an example, in accordance with some implementations, the management device 104 may be a communication interface of a bridge or hub of the computer platform. In accordance with further implementations, the management device 104 may be a communication interface of a central processing unit (CPU) package (or "socket"), a graphics processing unit (GPU) package or a microcontroller interface. Regardless of its particular form, the management device 104 may, in accordance with example implementations, communicate with a driver 101 for such purposes as receiving data to be communicated to the subordinate devices 105 and receiving data communicated from the subordinate devices 105.

In accordance with example implementations, the management device 104 controls when the serial bus communication subsystem 100 is configured to communicate SPI bus transactions and when the system 100 is configured to communicate I²C bus transactions. For example, in accordance with some implementations, the management device 104 may leave the serial bus communication subsystem 100 in its default I²C bus communications configuration and communicate with the I²C devices 120, as requests are received from the driver 101, until a particular SPI communication trigger occurs. In response to the trigger, the management device 104 may cause the SPI leader bus interface 110 to assert the CS0 #line to configure the serial bus communication subsystem 100 to communicate SPI bus transactions.

As examples, a trigger may be a SPI bus pending transaction buffer reaching a particular level, a priority associated with pending SPI transactions, inactivity of the I²C bus or another trigger. In accordance with further implementations, the driver 101 or other another device may control when the serial bus communication subsystem 100 is configured to communicate SPI bus transactions and when the system 100 is configured to communicate I²C bus transactions. For example, in accordance with some implementations, the driver 101 may provide a shared mutex object that controls when SPI bus transfers occur and when I²C bus transfers occur. As a more specific example, responsive to the shared mutex object being accessed by a thread that writes to or reads from a SPI device, the shared mutex object may control the management device 104 to assert the CS0 #line (if de-asserted) to configure the serial bus communication subsystem 100 for SPI bus communications and cause the management device 104 to initiate one or multiple SPI bus transfers. As another example, responsive to the shared mutex object being accessed by a thread that writes to or reads from an I²C device, the shared mutex object may control the management device 104 to de-assert the CS0 #line (if asserted) to configure the serial bus communication subsystem 100 for I²C bus communications and cause the management device 104 to initiate one or multiple I²C bus transfers.

Figure 2:
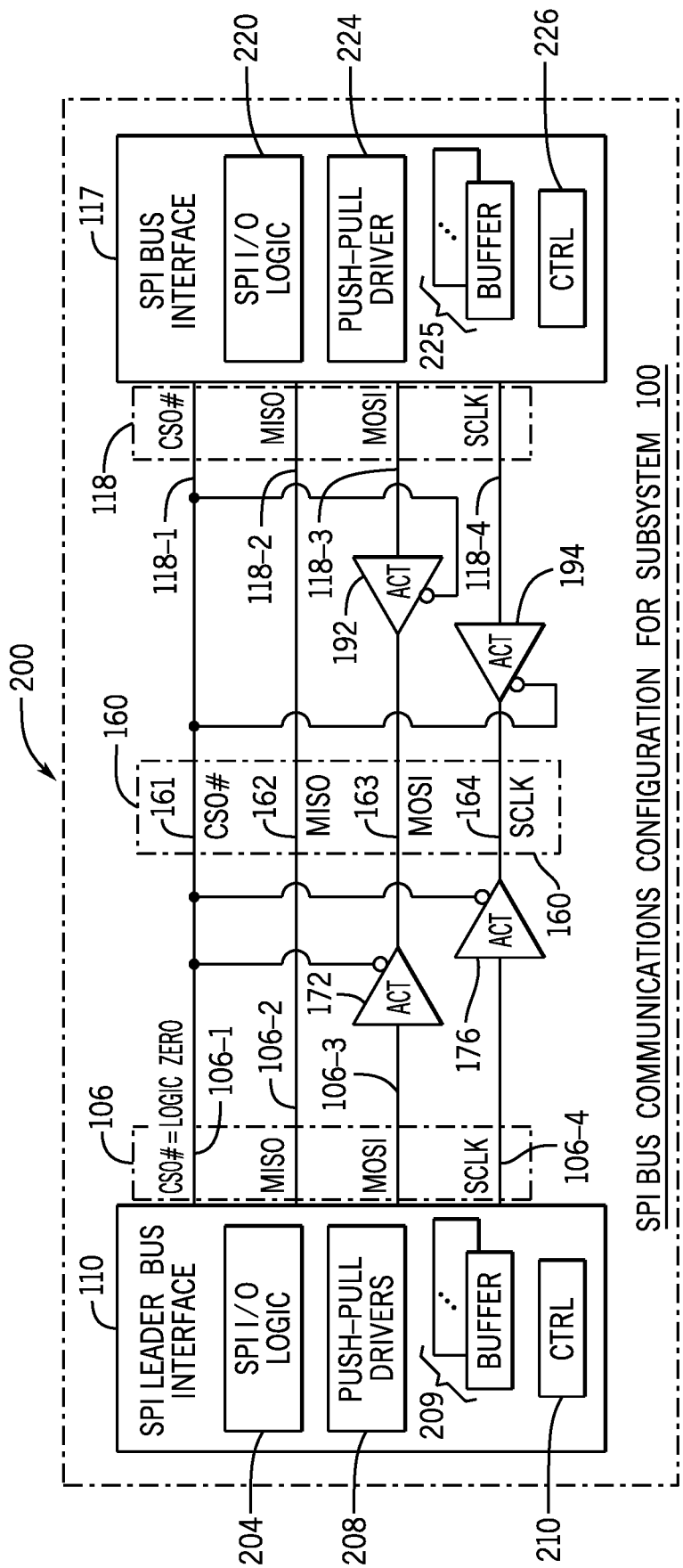
FIG. 2 is an illustration of the serial bus communication subsystem of FIG. 1 configured for SPI bus communications according to an example implementation.

Referring to FIG. 2 in conjunction with FIG. 1, in accordance with some implementations, the SPI leader bus interface 110 may assert the CS0 #line 161 (e.g., drives the CS0 #line 161 to a logic zero level) to place the serial communication subsystem 100 in a SPI bus communications configuration 200. In the SPI bus communications configuration 200, the tri-state buffers 172, 176, 192 and 194 are activated, as denoted by the "ACT" text. The remaining tri-state buffers 174, 178, 196 and 198 of the coupling circuits 170 and 190 are deactivated, or turned off, and are not depicted in FIG. 2.

As depicted in FIG. 2, the tri-state buffers 172 and 192 couple the MOSI terminals of the SPI leader bus interfaces 110 and 117 together. In this manner, the tri-state buffer 172 couples the MOSI terminal 106-3 to the MOSI communication line 163, and the tri-state buffer 192 couples the MOSI communication line 163 to the MOSI terminal 118-3. Also, for the SPI bus communications configuration 200, the tri-state buffers 176 and 194 couple the SCLK terminals of the SPI leader bus interfaces 110 and 117 together. In this manner, the tri-state buffer 176 couples the SCLK terminal 106-4 to the SCLK communication line 164, and the tri-state buffer 194 couples the SCLK communication line 164 to the SCLK terminal 118-4. For this example implementation, the CS0 #terminals 106-1 and 118-1 are coupled together and are not shared with the I²C bus; and the MISO terminals 106-2 and 118-2 are coupled together and are not shared with the I²C bus.

As also depicted in FIG. 2, in accordance with example implementations, the SPI leader bus interface 110 may include, among its other features, SPI input/output (I/O) logic 204; push-pull drivers 208 for the CS0 #terminal 106-1, MOSI terminal 106-3 and SCLK terminal 106-4; control logic 210; and one or multiple transaction buffers 209 (e.g., an incoming transaction buffer and an incoming transaction buffer). Moreover, in accordance with example implementations, the SPI bus interface 117 may include, among its other features, SPI I/O logic 220; a push-pull driver 224 for the MISO terminal 118-2; control logic 226; and one or multiple transaction buffers 225.

Figure 3:
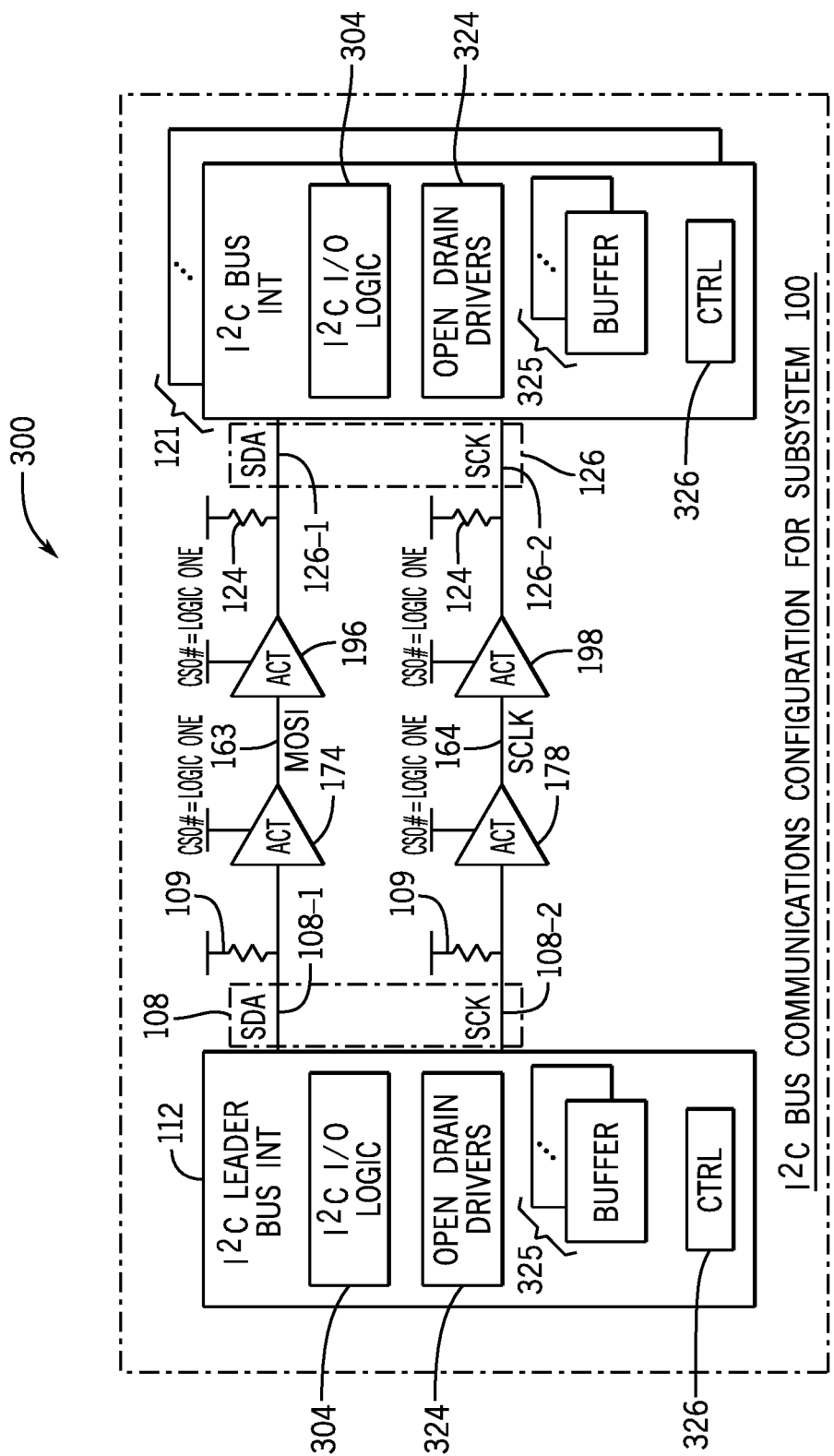
FIG. 3 is an illustration of the serial bus communication subsystem of FIG. 1 configured for $I^2C$ bus communications according to an example implementation.

Referring to FIG. 3 in conjunction with FIG. 1, in accordance with some implementations, the SPI leader bus interface 110 may de-assert the CS0 #line 161 (e.g., drives the CS0 #line 161 to a logic one state) to place the serial communication subsystem 100 in an I²C bus communications configuration 300. In the I²C bus communications configuration 300, the tri-state buffers 174, 178, 196 and 198 are activated, as denoted by the "ACT" text. The remaining tri-state buffers 172, 176, 192 and 194 of the coupling circuits 170 and 190 are deactivated, or turned off, and are not depicted in FIG. 3. More specifically, as depicted in FIG. 3, tri-state buffers 174 and 196 couple the SDA terminals of the I²C bus interfaces 112 and 121 together. In this manner, the tri-state buffer 174 couples the SDA terminal 108-1 to the MOSI line 163, and the tri-state buffer 196 couples the MOSI line 163 to the SDA terminal 126-1. Also, for the I²C bus communications configuration 300, the tri-state buffers 178 and 198 couple the SCK terminals of the I²C bus interfaces 112 and 121 together. In this manner, the tri-state buffer 178 couples the SCK terminal 108-2 to the SCLK communication line 164, and the tri-state buffer 198 couples the SCLK communication line 164 to the SCK terminal 126-2. As also depicted in FIG. 3, in accordance with example implementations, each I²C bus interface 112,121 may include, among its other features, I²C I/O logic 304; open drain drivers 324 for the SDA and SCK terminals; control logic 326 and one or multiple transaction buffers 325.

Figure 4:
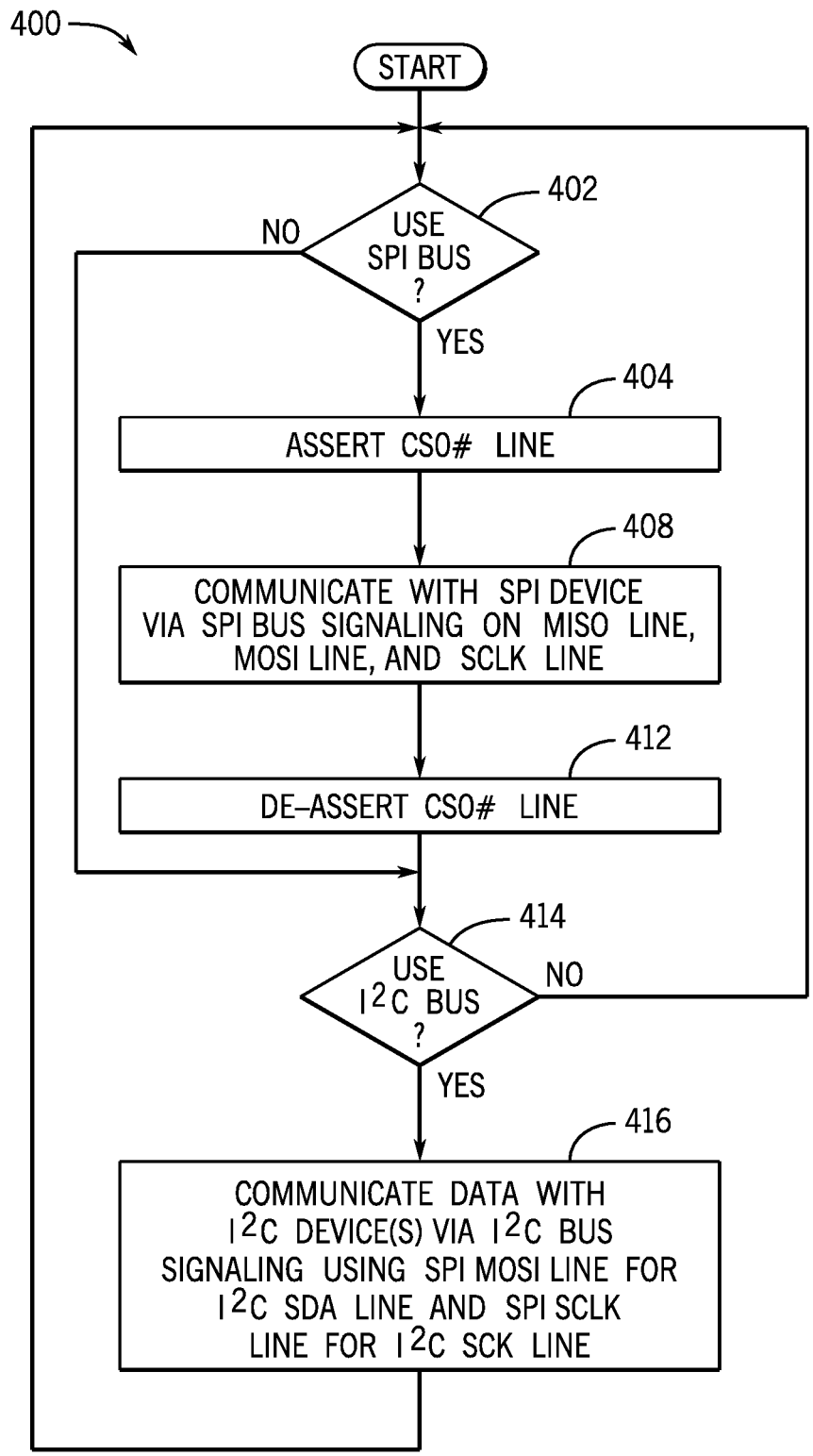
FIG. 4 is a flow diagram depicting a process to share communication lines of a SPI bus with an $I^2C$ bus according to an example implementation.

FIG. 4 depicts a process 400 that may be used in connection with the serial bus communication subsystem 100 of FIG. 1 for purposes of sharing communication lines of a SPI bus with an I²C bus, in accordance with example implementations. In accordance with example implementations, the actions that are set forth in the process 400 may be performed by the management device 104.

Referring to FIG. 4, in accordance with some implementations, the process 400 includes determining (decision block 402) whether the serial bus communication subsystem is to be used for SPI bus communications. The decision of decision block 402 may be made by the serial bus communication subsystem (e.g., made by a management device), a driver for the serial bus communication subsystem or a combination of the serial bus communication subsystem and a driver, in accordance with example implementations. If, pursuant to decision block 402, a decision is made to configure the serial bus communication subsystem for SPI bus communications, then, pursuant to block 404, the process 400 includes asserting the CS0 #line. As described herein, the assertion of the CS0 #line, in accordance with some implementations, isolates the I²C devices from the shared communication lines and couples the SPI devices to the shared communication lines. Next, pursuant to block 408, the process 400 includes communicating with a subordinate SPI device via SPI bus signaling on the MISO line, the MOSI line and the SCLK line.

At the conclusion of the SPI bus communications, the CS0 #line may then be de-asserted, pursuant to block 412 for purposes of placing the serial communication subsystem in its default I²C bus communications configuration. In accordance with example implementations, if there are pending I²C bus transactions, then, pursuant to decision block 414, the process 400 includes communicating data with I²C bus devices via I²C bus signaling using the MOSI line for the I²C SDA line and using the SCLK line for the I²C SCK line. The decision of decision block 414 may be made by the serial bus communication subsystem (e.g., made by a management device), a driver for the serial bus communication subsystem or a combination of the serial bus communication subsystem and a driver, in accordance with example implementations. Control then returns, in accordance with example implementations, back to decision block 402, with the serial bus communication subsystem remaining in the default I²C bus communications configuration.

Figure 5:
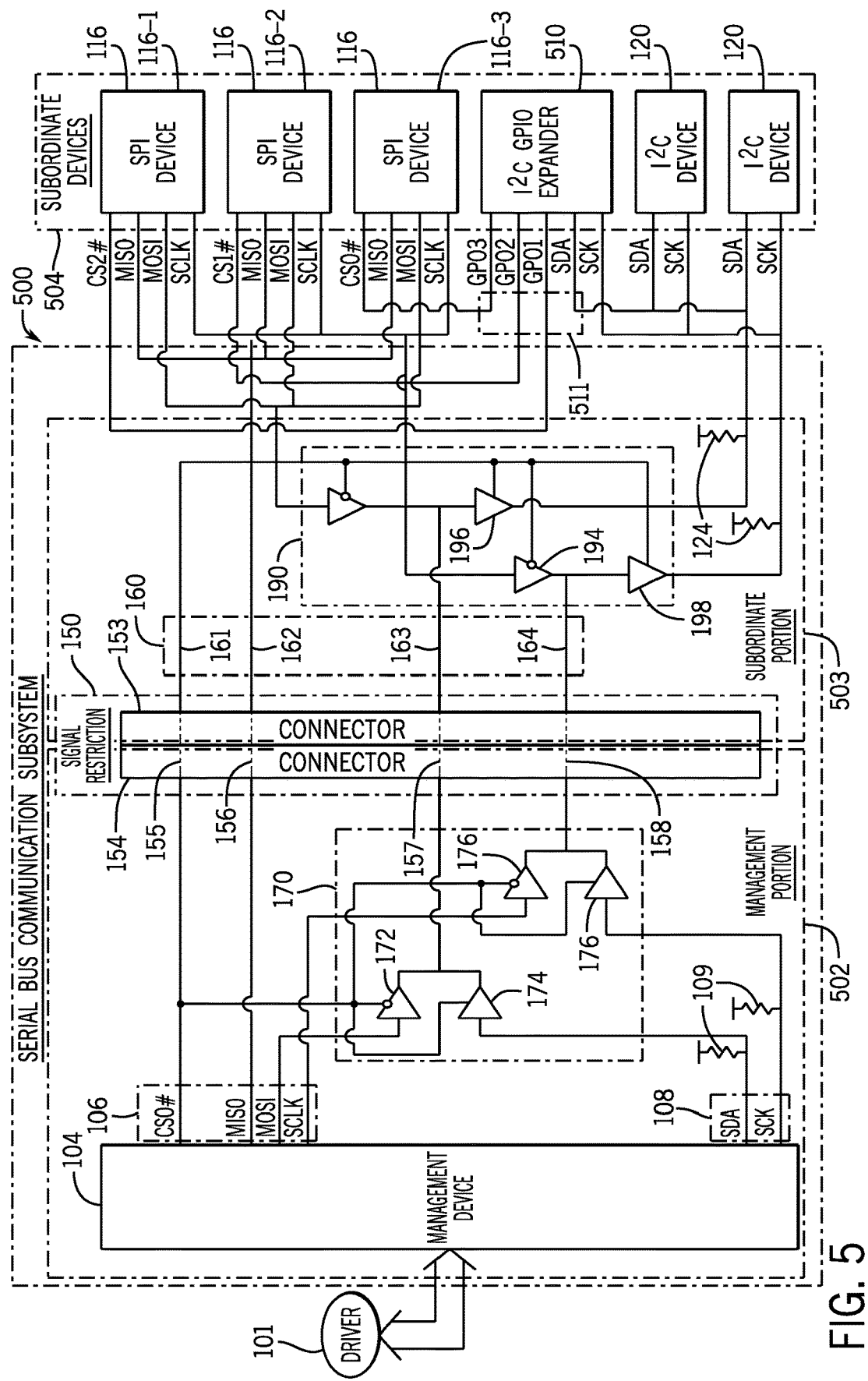
FIG. 5 is a schematic diagram of a serial bus communication subsystem system that shares communication lines of a SPI bus with an $I^2C$ bus for communications according to a further example implementation.

In accordance with example implementations, a serial bus communication subsystem, such as a serial bus communication subsystem 500 that is depicted in FIG. 5, may include multiple subordinate SPI devices 116. More specifically, referring to FIG. 5, in accordance with some implementations, the serial bus communication subsystem 500 includes subordinate devices 501, which include, for this example, three SPI devices 116-1, 116-2 and 116-3. Moreover, as also depicted in FIG. 5, in accordance with some implementations, the subordinate devices 501 may include multiple I²C devices 120. As depicted in FIG. 5, the serial bus communication subsystem 500 includes a management portion 502 on the management device side of a signal restriction 150 and a subordinate portion 503 on a subordinate device side of the signal restriction 150.

In general, the serial bus communication subsystem 500 has similar features to the serial bus communication subsystem 100 of FIG. 1, with the similar features being denoted in FIG. 5 by the same reference numerals and different features being denoted in FIG. 5 by reference numerals that do not appear in FIG. 1.

One approach that may potentially be used by the management device 104 to communicate with multiple SPI devices 116 is for the management device 104 to provide multiple chip select signals (e.g., multiple CS #signals corresponding to multiple CS #lines) and assert the chip select signals, one at a time, to specifically designate the SPI device for SPI bus communications. However, this approach adds an additional communication line for each additional SPI device 116, which may pose challenges for the signal restriction 150. In accordance with example implementations, the serial bus communication subsystem 500 has multiple subordinate SPI devices 116 and maintains the use of a single CS0 #line through the restriction 150. To do this, in accordance with example implementations, the management device 104 asserts the CS0 #line to enable the use of the SPI bus and communicates SPI device selection data (representing the selection of a particular SPI device 116) via I²C bus communication.

More specifically, in accordance with some implementations, the serial bus communication subsystem 500 includes an I²C general purpose input/output (GPIO) expander 510. For this application, the I²C GPIO expander 510 has I²C SDA and SCK terminals that are coupled to the I²C bus, and the I²C GPIO expander 510 has three output terminals 511: a GPO1 terminal that is coupled to a CS2 #terminal of the SPI device 116-1; a GPO2 terminal that is coupled to a CS1 #terminal of the SPI device 116-2; and a GPO3 terminal that is coupled to a CS0 #terminal of the SPI device 116-3.

To select a particular SPI device 116, the management device 104 first uses I²C bus communications to communicate selection data to the I²C GPIO expander 510. In this manner, the management device 104 asserts the CS0 #line 161 to configure the serial communication subsystem 500 for I²C communications, and then the management device 104 initiates an I²C transfer that targets the I²C GPIO expander 510 as a subordinate device and writes selection data to the I²C GPIO expander 510. In response to receiving the selection data, the I²C GPIO expander 510 asserts (e.g., drives to a logic zero) one of its GPO terminals to select the corresponding SPI device 116 and de-asserts (e.g., drive to a logic one) each of its remaining GPO terminals. For example, the selection data may selected SPI device 116-2, and in response to the selection data, the I²C GPIO expander 510 asserts the GPO2 terminal 115, and the I²C GPIO expander 510 de-asserts the GPO1 terminal 115 and de-asserts the GPO3 terminal. The SPI device 116-2 then becomes activated to respond to SPI transactions in response to the I²C GPIO expander's assertion of its GPO2 terminal.

Figure 6:
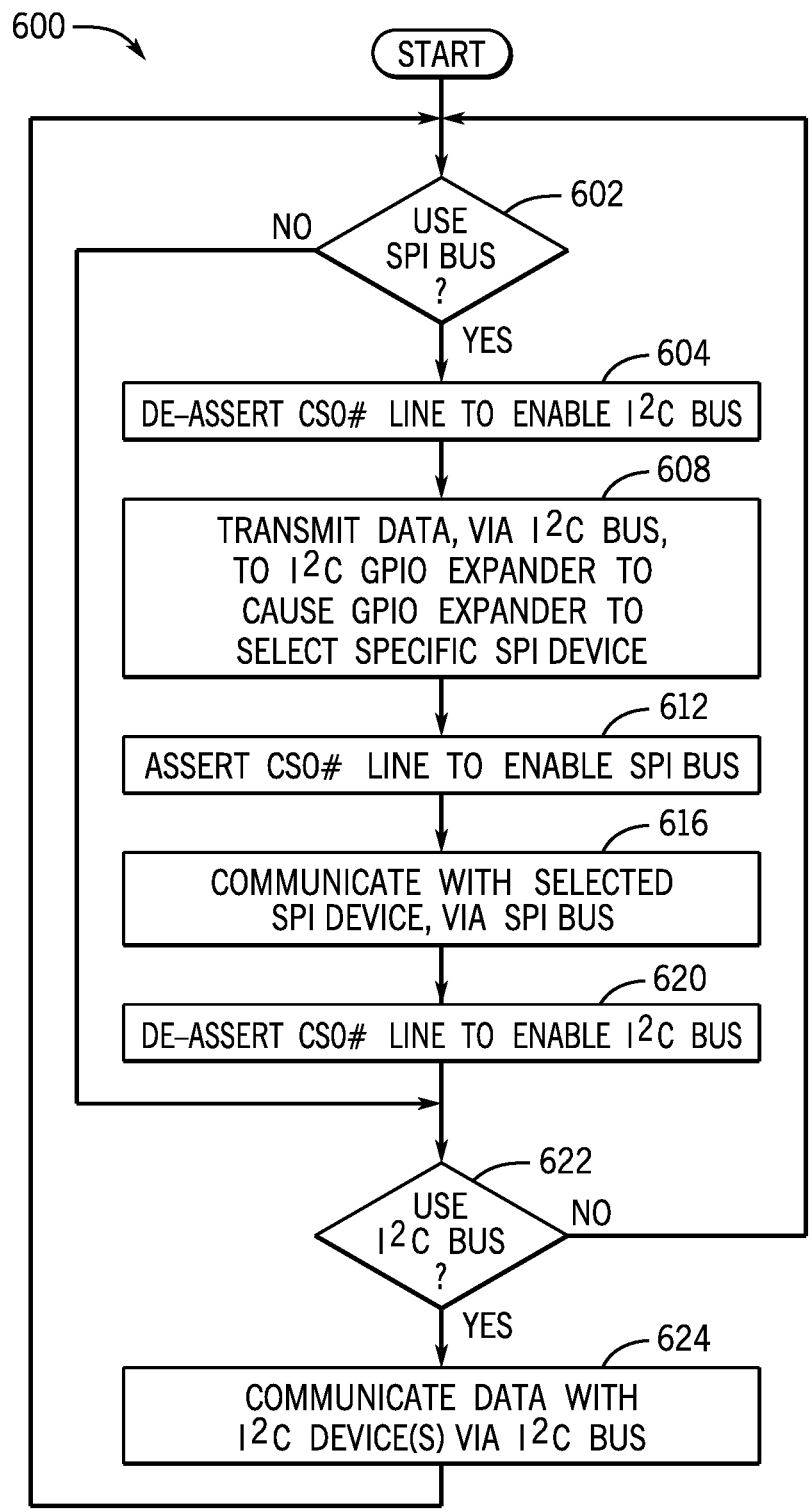
FIG. 6 is a flow diagram depicting a process to share communication lines of a SPI bus with an $I^2C$ bus according to a further example implementation.

Therefore, in accordance with example implementations, a process 600 that is depicted in FIG. 6 may be used by a serial communication subsystem (e.g., the serial communication subsystem 500) for purposes of sharing communication lines of a SPI bus with an I²C bus and communicating with multiple subordinate SPI devices.

Referring to FIG. 6, pursuant to the process 600, a decision is made (decision block 602) whether to use the SPI bus. The decision of decision block 602 may be made by the serial bus communication subsystem (e.g., made by a management device), a driver for the serial bus communication subsystem or a combination of the serial bus communication subsystem and a driver, in accordance with example implementations. In accordance with example implementations, if, pursuant to decision block 602, a decision is made to not process SPI bus transactions, then control proceeds to decision block 622 for purposes of determining whether there are any pending I²C bus transactions to process.

If, pursuant to decision block 602, a decision is made to use the SPI bus transactions, then, pursuant to block 604, the process 600 includes de-asserting the CS0 #line to enable the I²C bus for purposes of communicating SPI bus device selection information to an I²C GPIO expander. The process 600 may then include transmitting (block 608) data via the I²C bus to the I²C GPIO expander to cause the I²C GPIO expander to select a specific SPI device. Pursuant to block 612, the process 600 includes asserting the CS0 #line to reconfigure the serial bus communication subsystem for SPI bus communications, and then, pursuant to block 616, communicating with the selected SPI device via the SPI bus. Pursuant to block 620, the process 600 includes de-asserting the CS0 #line to enable use of the I²C bus and place the serial communication subsystem in the default I²C bus communications configuration.

The process 600 further includes, in accordance with example implementations, pursuant to decision block 622, determine whether to process I²C bus transactions. The decision of decision block 622 may be made by the serial bus communication subsystem (e.g., made by a management device), a driver for the serial bus communication subsystem or a combination of the serial bus communication subsystem and a driver, in accordance with example implementations. If so, then, pursuant to block 624, the process 600 includes communicating data with I²C devices using the I²C bus. Control may then return to decision block 602.

Figure 7:
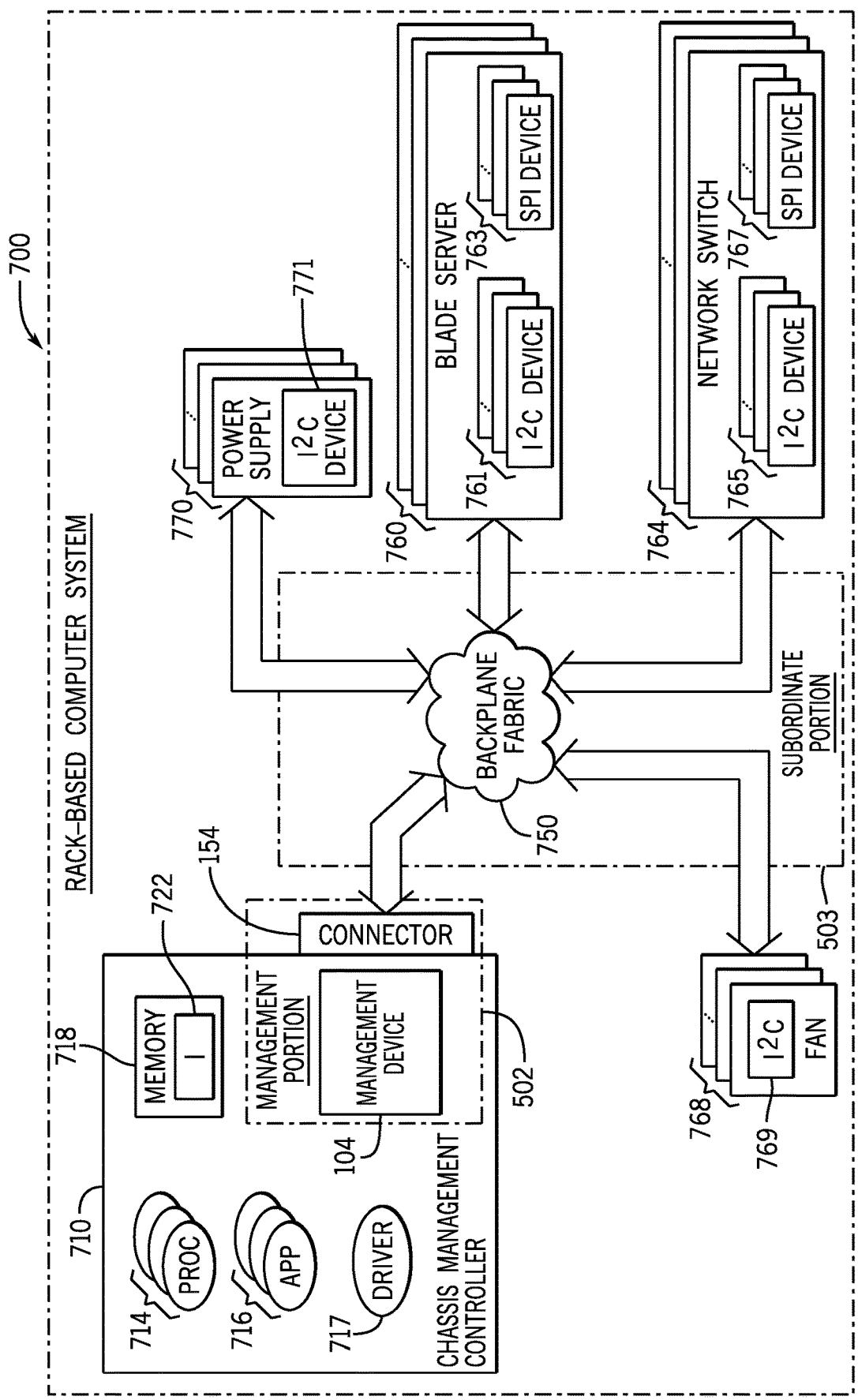
FIG. 7 is a block diagram of a rack-based computer system according to an example implementation.

Referring to FIG. 7, in accordance with some implementations, the serial bus communication subsystem may be used in a rack-based computer system 700 that includes a chassis management controller 710 and one or multiple blade servers 760. The chassis management controller 710 may, for example, have a connector 154 that connects the chassis management controller 710 to backplane fabric 750. The backplane fabric 750, as well as the connector 154, may introduce a signal restriction. Accordingly, the rack-based computer system 700 may employ a serial bus communication subsystem similar to any of those described herein for purposes of communicating with subordinate devices of the rack-based computer system 700.

As a more specific example, in accordance with some implementations, the rack-based computer system 700 may include a serial bus communication subsystem, which includes a management portion 502 and a subordinate portion 503 on either side of the signal restriction, similar to, for example, the management portion 502 and subordinate portion 503 of the serial bus communication subsystem 500 of FIG. 5. The subordinate devices may include, as examples, I²C devices 771 of power supplies 770; I²C devices 761 and SPI devices 763 of blade servers 760; I²C devices 765 and 767 of network switches 764; I²C devices 769 of fans 768; as well as other and/or different subordinate devices associated with other and/or different components of the rack-based computer system 700.

The subordinate bus devices may be associated with any of a number of different components of the rack-based computer system 700, such as temperature sensors, fan velocity sensors, intrusion detection sensors; current monitoring sensors; non-volatile memories; as well as other components.

In accordance with some implementations, the chassis management controller 710 is a computer platform that includes one or multiple hardware processors 714 (e.g., one or multiple CPUs, one or multiple CPU processing cores, one or multiple CPU semiconductor packages, or "sockets;" one or multiple GPUs; and so forth). In accordance with some implementations, the hardware processor(s) 714 may execute machine-readable instructions 722 that are stored in a memory 718 of the chassis management controller 710 for purposes of managing and/or monitoring the subordinate bus devices. In accordance with some implementations, the instructions 722 may correspond to a driver 717 and one or multiple applications 716. The memory 718 is a non-transitory storage media that may be formed from semiconductor storage devices, memristor-based storage devices, magnetic storage devices, phase change memory devices, a combination of devices of one or more of these storage technologies, and so forth. The memory 718 may represent a collection of memories of both volatile memory devices and non-volatile memory devices.

Figure 8:
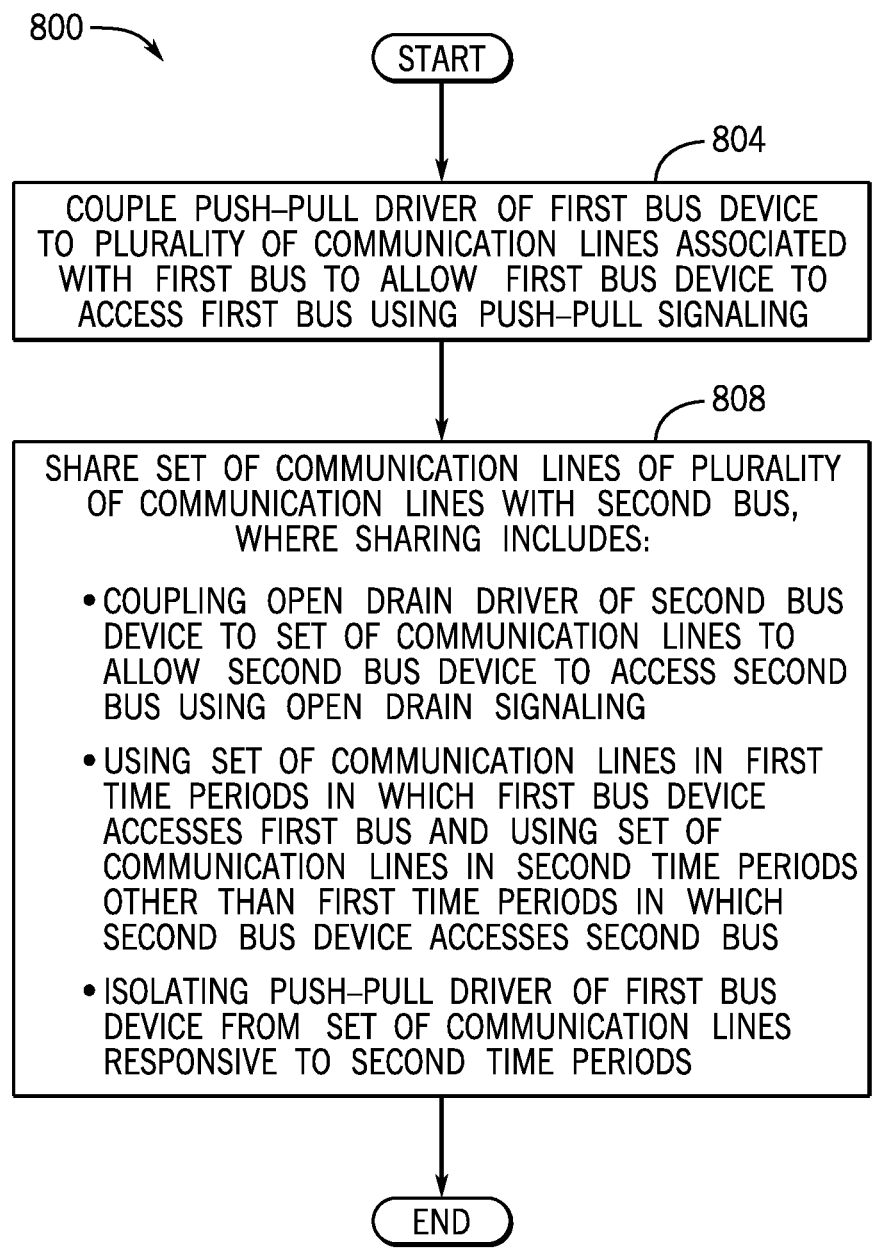
FIG. 8 is a flow diagram depicting a process to share a set of communication lines of a first bus with a second bus according to an example implementation.

Referring to FIG. 8, in accordance with example implementations, a process 800 includes coupling (block 804) a push-pull driver of a first bus device to a plurality of communication lines that are associated with a first bus to allow the first bus device to access the first bus using push-pull signaling. In accordance with some implementations, the first bus may be a SPI bus. In accordance with some implementations, coupling the push-pull driver to the plurality of communication lines may include activating one or multiple tri-state buffers. In accordance with some implementations, the coupling of the push-pull driver to the plurality of communication lines may be responsive to a selection signal, such as a SPI bus selection signal. In accordance with some implementations, coupling the push-pull driver to the plurality of communication lines includes coupling the push-pull driver to an MISO line of a SPI bus.

Pursuant to block 808, in accordance with example implementations, the process 800 includes sharing a set of communication lines of the plurality of communication lines with a second bus. In accordance with some implementations, the second bus may be an I²C bus. In accordance with some implementations, the set of communication lines may be a pair of the plurality of communication lines. In accordance with some implementations, the pair of communication lines may be MISO and MOSI SPI bus lines, MISO and CLK SPI bus lines; or MOSI and CLK SPI bus lines.

In accordance with example implementations, sharing the set of communication lines includes coupling open drain logic of a second bus device to the set of communication lines to allow the second bus device to access the second bus using open drain signaling. In accordance with example implementations, the second bus device may be a SPI bus device. In accordance with example implementations, coupling the open drain logic to the set of communication lines includes activating a tri-state buffer. The sharing of the set of communication lines with the second bus further includes, in accordance with example implementations, using the set of communication lines in first time periods in which the first bus device accesses the first bus and using the set of communication lines in second time periods in which the second bus device accesses the second bus.

In accordance with example implementations, sharing the set of communication lines with the second bus includes isolating the push-pull driver from the set of communication lines responsive to the second time periods. In accordance with some implementations, isolating the push-pull driver includes deactivating a tri-state buffer in response to the de-assertion of a chip select signal. In accordance with some implementations, isolating the push-pull driver from the set of communication lines includes deactivating a tri-state buffer responsive to the de-assertion of a SPI bus chip select signal.

Figure 9:
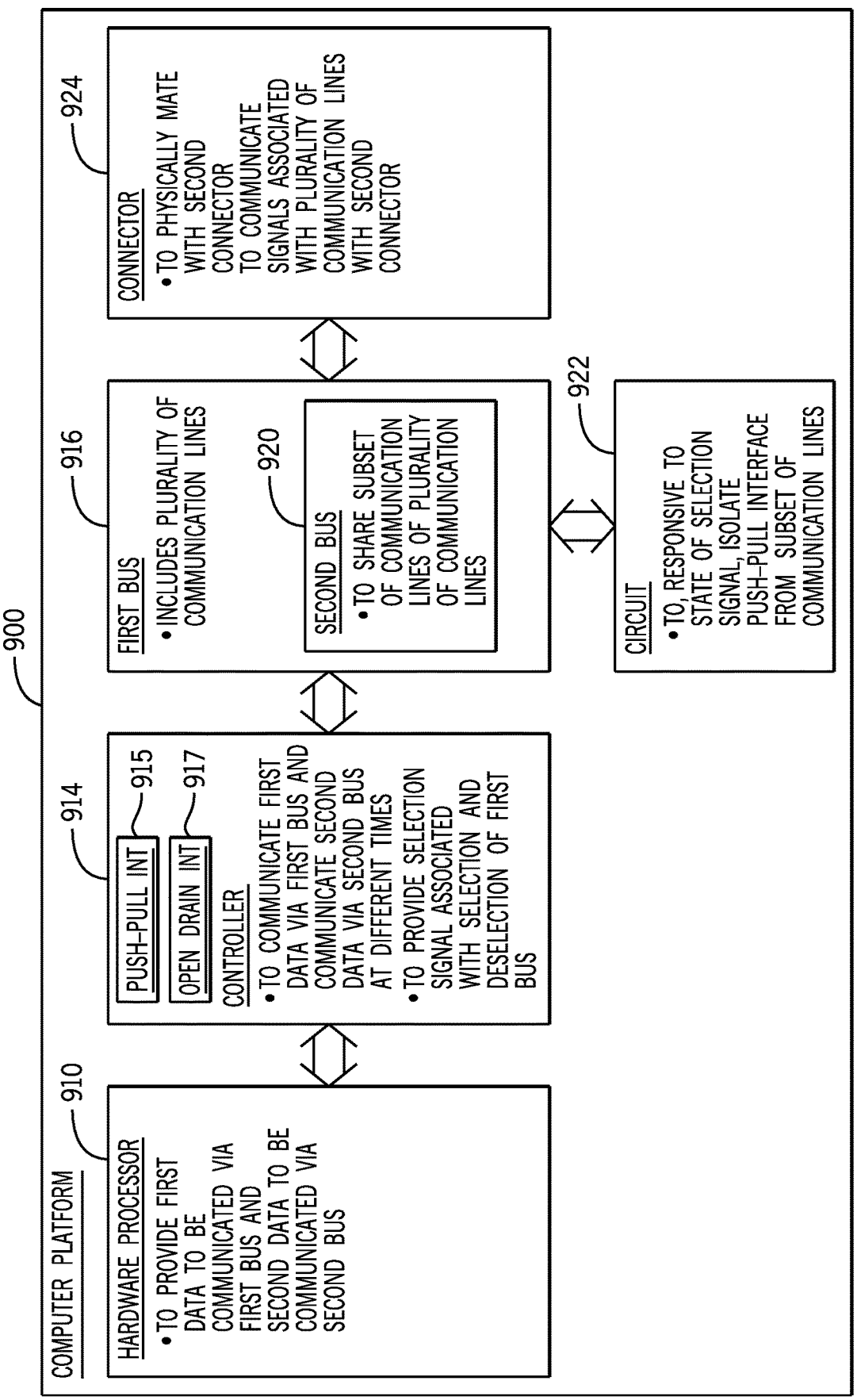
FIG. 9 is a block diagram of a computer platform that includes buses that share communication lines according to an example implementation.

Referring to FIG. 9, in accordance with example implementations, a computer platform 900 includes a first bus 916; a first connector 924; a second bus 920; a hardware processor 910; and a controller 914. The first bus 916 includes a plurality of communication lines, and the first connector 924 is to physically mate with a second connector to communicate signals that are associated with the plurality of communication lines with the second connector. In accordance with example implementations, the first bus may be a SPI bus. In accordance with example implementations, the computer platform may be a chassis management controller, and the first connector may be a backplane connector of the chassis management controller.

In accordance with example implementations, the computer platform 900 includes a second bus to share a subset of communication lines of the plurality of communication lines. In accordance with some implementations, the second bus may be an I²C bus. In accordance with example implementations, the subset of communication lines may be a pair of SPI bus communication lines. The pair of communication lines may be MISO and MOSI SPI bus lines, MISO and CLK SPI bus lines; or MOSI and CLK SPI bus lines.

In accordance with example implementations, the hardware processor is to provide first data to be communicated via the first bus and second data to be communicated via the second bus. In accordance with example implementations, the hardware processor 910 may be a CPU processing core, a CPU socket, or a GPU processing core. The controller 914, in accordance with some implementations, includes a push-pull interface 915. In accordance with some implementations, the push-pull interface 915 may include a push-pull driver. In accordance with some implementations, the push-pull interface 915 may include input logic. In accordance with example implementations, the controller 914 may include a second open drain interface 917 to communicate the second data with the second bus. In accordance with some implementations, the second open drain interface 917 may include an open drain driver. In accordance with some implementations, the open drain interface may include input logic.

In accordance with example implementations, the controller 914 is to communicate first data via the first bus and communicate second data via the second bus at different times. In accordance with some implementations, the time-division multiplexing may include configuring a serial bus communication subsystem for SPI bus communications during first time periods, and in second time periods, configuring the serial bus communication subsystem for I²C bus communications. The controller 914, in accordance with example implementations, is to provide a selection signal that is associated with selection and deselection of the first bus. In accordance with some implementations, the selection signal may be a SPI bus chip select signal.

In accordance with example implementations, the circuit 922 is coupled to the plurality of communication lines to, responsive to a state of the selection signal, isolate the push-pull interface from the subset of communication lines. In accordance with some implementations, the circuit may include one or multiple tri-state buffers. In accordance with some implementations, the circuit may deactivate a tri-state buffer to decouple a push-pull driver of a SPI device from the subset of communication lines responsive to the de-assertion of the chip select signal.

Figure 10:
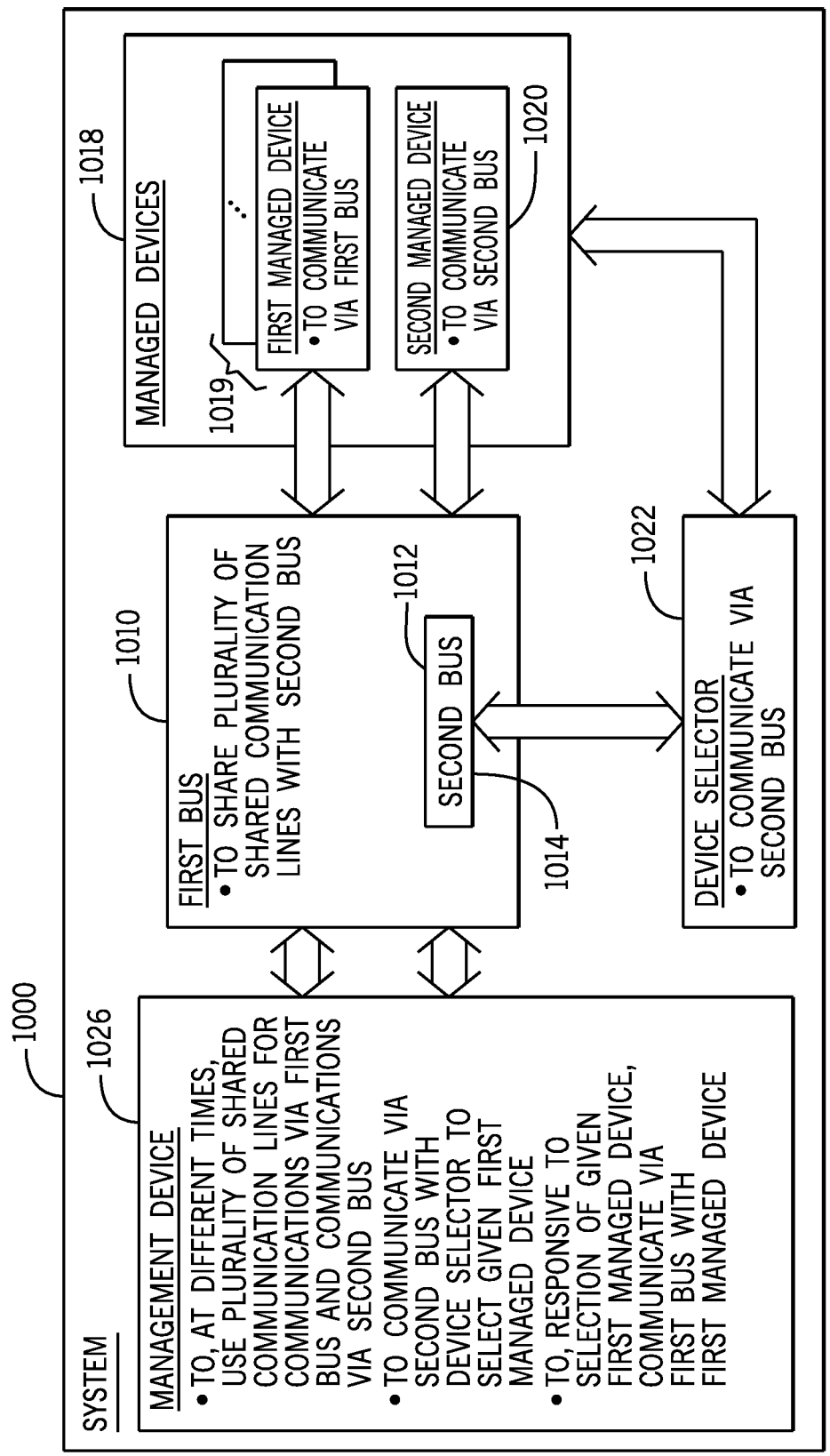
FIG. 10 is a block diagram of a system that includes buses that share communication lines according to an example implementation.

Referring to FIG. 10, in accordance with some implementations, a system 1000 includes a first bus 1010; a second bus 1012; a device selector 1022; and a management device 1026. In accordance with some implementations, the first bus shares a plurality of shared communication lines with the second bus. In accordance with example implementations, the first bus may be a SPI bus. In accordance with example implementations, the second bus may be an I²C bus. The managed devices 1018, in accordance with example implementations, include first managed devices 1019 to communicate with each other via the first bus and at least one second managed device 1020 to communicate via the second bus 1012. In accordance with some implementations, the first managed device 1019 may be a SPI device. In accordance with example implementations, the second managed device may be an I²C device.

The device selector 1022, in accordance with example implementations, communicates with the second bus 1012. In accordance with some implementations, the device selector may be a GPIO expander. In accordance with some implementations, the device selector may be an I²C GPIO expander.

In accordance with example implementations, the management device 1026 may be a microcontroller. In accordance with some implementations, the management device may be a GPU. In accordance with some implementations, the management device may be a CPU or GPU package. Moreover, in accordance with some implementations, the management device 1026 may be a dual I²C and SPI bus interface. In accordance with some implementations, the management device 1026, at different times, uses the plurality of shared communication lines between communications via the first bus 1010 and communications via the second bus 1012. In accordance with example implementations, the management device 1026 communicates via the second bus with the device selector to select a given first managed device.

In accordance with some implementations, the communications with the device selector 1022 includes the management device 1026 communicating data with an I²C GPIO expander, where the data identifies a particular SPI device. In accordance with example implementations, the management device 1026, responsive to the selection of the given first managed device, communicates via the first bus device with the first managed device. In accordance with example implementations, an I²C GPIO expander asserts a GPO output that is connected to the chip select terminal of a SPI device identified by the data for purposes of selecting the SPI device.

In accordance with example implementations, isolating the push-pull driver includes decoupling the push-pull driver from the set of communication lines in response to a de-assertion of a device selection signal that is associated with the first bus. Particular advantages include minimizing the number of communication lines for I²C bus and SPI bus communications while preventing I²C bus devices from malfunctioning due to push-pull signaling by SPI bus devices.

In accordance with example implementations, the first bus device is a member of a plurality of first bus devices. The process may further include communicating, by a management device, data over the second bus representing a selection of the first bus device from the plurality of first bus devices; and responsive to the communication, generating the device selection signal based on the data. Particular advantages include minimizing the number of communication lines for I²C bus and SPI bus communications while preventing I²C bus devices from malfunctioning due to push-pull signaling by SPI bus devices.

In accordance with example implementations, sharing the set of communication lines further includes maintaining the coupling of the open drain logic to the set of communication lines during both the first time periods and the second time periods. Particular advantages include minimizing the number of communication lines for I²C bus and SPI bus communications while preventing I²C bus devices from malfunctioning due to push-pull signaling by SPI bus devices.

In accordance with example implementations, the plurality of communication lines includes a pair of bidirectional data lines and a clock line; and the sharing includes sharing a bidirectional data line of the pair with the second bus. Particular advantages include minimizing the number of communication lines for I²C bus and SPI bus communications while preventing I²C bus devices from malfunctioning due to push-pull signaling by SPI bus devices.

In accordance with example implementations, coupling the push-pull driver includes coupling the push-pull driver to a given communication line via a first tri-state buffer responsive to an assertion of a chip select signal that is associated with the first bus device. Coupling the open drain logic includes coupling the open drain logic to the given communication line via a second tri-buffer driver responsive to a de-assertion of the chip select signal. Particular advantages include minimizing the number of communication lines for I²C bus and SPI bus communications while preventing I²C bus devices from malfunctioning due to push-pull signaling by SPI bus devices.

In accordance with example implementations, the first bus device includes a first follower bus device, the second bus device includes a first follower bus device, and the method further includes routing the plurality of communication lines through a connector. The first follower bus device and the second follower bus device are associated with a first set of connectors. The process further includes communicating, by a leader device, with the first follower bus device using the first bus device and communicating, by the leader device, with the second follower bus device using the second bus. The leader device is associated with a second side of the connector other than the first side. Particular advantages include minimizing the number of communication lines for I²C bus and SPI bus communications while preventing I²C bus devices from malfunctioning due to push-pull signaling by SPI bus devices.

In accordance with example implementations, the process further includes coupling a push-pull driver of the leader device to a given communication line via a first tri-state buffer responsive to an assertion of a chip select signal that is associated with the first bus device. The process further includes coupling open drain logic of the leader device to the given communication line via a second tri-state buffer responsive to a de-assertion of the chip select signal. Particular advantages include minimizing the number of communication lines for I²C bus and SPI bus communications while preventing I²C bus devices from malfunctioning due to push-pull signaling by SPI bus devices.

In accordance with example implementations, the first bus includes a serial peripheral interface (SPI) bus, and the second bus includes an Inter-Integrated Circuit (I²C) bus. Particular advantages include minimizing the number of communication lines for I²C bus and SPI bus communications while preventing I²C bus devices from malfunctioning due to push-pull signaling by SPI bus devices.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   coupling a first bus device to a plurality of communication lines of a first bus, wherein the plurality of communication lines comprises a subset of communication lines, and coupling the first bus device to the plurality of communication lines comprises coupling a push-pull driver of the first bus device to a given communication line of the subset of communication lines to allow the first bus device to access the first bus using push-pull signaling; and
   sharing the subset of communication lines with a second bus other than the first bus, wherein the sharing comprises:
      coupling open drain logic of a second bus device to the subset of communication lines to allow the second bus device to access the second bus using open drain signaling; and
      using the subset of communication lines in first time periods in which the first bus device accesses the first bus and using the subset of communication lines in second time periods other than the first time periods in which the second bus device accesses the second bus;
   responsive to the first time periods, communicating, by the first bus device, data with the first bus via the set of communication lines and an additional communication line of the plurality of communication lines, wherein the additional communication line is associated with the first bus and is not shared with the second bus; and
   isolating the push-pull driver from the given communication line responsive to the second time periods.

2. The method of claim 1, wherein isolating the push-pull driver comprises decoupling the push-pull driver from the subset of communication lines in response to a de-assertion of a device selection signal associated with the first bus.

3. The method of claim 2, wherein the first bus device is a member of a plurality of first bus devices, the method further comprising:
   communicating, by a management device, data over the second bus representing a selection of the first bus device from the plurality of first bus devices; and
   responsive to the communicating, generating the device selection signal based on the data.

4. The method of claim 1, wherein sharing the subset of communication lines further comprises maintaining the coupling of the open drain logic to the subset of communication lines during both the first time periods and the second time periods.

5. The method of claim 1, wherein the plurality of communication lines comprises a pair of bidirectional data lines and a clock line, and the sharing comprises sharing a bidirectional data line of the pair with the second bus.

6. The method of claim 1, wherein:
   coupling the push-pull driver comprises coupling the push-pull driver to the given communication line via a first tri-state buffer responsive to an assertion of a chip select signal associated with the first bus device; and
   coupling the open drain logic comprising coupling the open drain logic to the given communication line via a second tri-state buffer responsive to a de-assertion of the chip select signal.

7. The method of claim 1, wherein the first bus device comprises a first follower bus device, the second bus device comprises a second follower bus device, the method further comprising:
   routing the plurality of communication lines through a connector, wherein the first follower bus device and the second follower bus device are associated with a first side of the connector;
   communicating, by a leader device, with the first follower bus device using the first bus and communicating, by the leader device, with the second follower bus device using the second bus, wherein the leader device is associated with a second side of the connector other than the first side.

8. The method of claim 7, further comprising:
   coupling a push-pull driver of the leader device to the given communication line via a first tri-state buffer responsive to an assertion of a chip select signal associated with the first bus device; and
   coupling open drain logic of the leader device to the given communication line via a second tri-state buffer responsive to a de-assertion of the chip select signal.

9. The method of claim 1, wherein the first bus comprises a Serial Peripheral Interface (SPI) bus, and the second bus comprises an Inter-Integrated Circuit (I²C) bus.

10. A computer platform comprising:
    a first bus comprising a plurality of communication lines;
    a first connector to physically mate with a second connector to communicate signals associated with the plurality of communication lines with the second connector;
    a second bus other than the first bus to share a subset of communication lines of the plurality of communication lines, wherein the subset of communication lines is less in number than the plurality of communication lines;
    a hardware processor to provide first data to be communicated via the first bus and second data to be communicated via the second bus;
    a controller comprising a push-pull interface to communicate the first data with the first bus and a second open drain interface to communicate the second data with the second bus, wherein the controller to:
       communicate the first data via the plurality of communication lines of the first bus at first times;

communicate the second data via the subset of communication lines of the second bus at second times other than the first times, wherein communicating the second data via the subset of communication lines comprises not using any communication line or lines of the plurality of communication lines other than the communication lines of the subset of communication lines to communicate the second data; and provide a selection signal associated with selection and deselection of the first bus; and a circuit coupled to the plurality of communication lines to, responsive to a state of the selection signal, isolate the push-pull interface from the subset of communication lines.

11. The computer platform of claim 10, wherein the circuit to further, responsive to the state of the selection signal, couple the push-pull interface to the subset of communication lines.

12. The computer platform of claim 10, wherein:
the controller to further communicate third data via the second bus to select a bus device; and
the push-pull interface to communicate the first data with the bus device.

13. The computer platform of claim 10, wherein:
the first bus comprises a Serial Peripheral Interface (SPI) bus; and
the second bus comprises an Inter-Integrated Circuit (I²C) bus.

14. The computer platform of claim 10, wherein the computer platform comprises a chassis manager, and the hardware processor to provide the first data and provide the second data to manage a blade server.

15. The computer platform of claim 10, wherein the circuit comprises tri-state buffers coupled to the subset of communication lines, the push-pull interface and the open drain interface, wherein the tri-state buffers to:
responsive to the state of the selection signal representing the selection of the first bus, couple the push-pull interface to the subset of communication lines and isolate the open drain interface from the subset of communication lines; and
responsive to the state of the selection signal representing the deselection of the first bus, isolate the push-pull interface from the subset of communication lines and couple the open drain interface to the subset of communication lines.

16. A system comprising:
a first bus;
a second bus other than the first bus, wherein the first bus shares a plurality of shared communication lines with the second bus;

a plurality of managed devices, wherein the plurality of managed devices comprises first managed devices to each communicate via the first bus and at least one second managed device of the plurality of managed devices to communicate via the second bus;
a device selector to communicate via the second bus; and
a management device to:
at different times, use the plurality of shared communication lines between communications via the first bus and communications via the second bus; and
communicate via the second bus with the device selector to select a given first managed device; and
responsive to the selection of the given first managed device, communicate via the first bus with the first managed device.

17. The system of claim 16, wherein the device selector comprises an input/output (I/O) expander, and the I/O expander to:
provide a plurality of selection signals corresponding to respective managed devices of the first managed devices;
receive data in the communication with the management device identifying the given first managed device; and
responsive to the data, asserting the selection signal of the plurality of selection signals corresponding to the given first managed device.

18. The system of claim 16, wherein the first bus comprises a Serial Peripheral Interface (SPI) bus, and the second bus comprises an Inter-Integrated Circuit (I²C) bus device.

19. The system of claim 16, wherein the shared communication lines comprise one of:
lines shared by data lines of the first bus, a clock line of the second bus and a data line of the second bus; or
lines shared by a data line of the first bus, a clock line of the first bus, a clock line of the second bus and a data line of the second bus.

20. The system of claim 16, further comprising:
drivers coupled to the plurality of shared communication lines and the first managed devices,
wherein:
the management controller to further assert a selection signal; and
the drivers, responsive to the assertion of the selection signal, couple the first managed devices to the plurality of shared communication lines.

21. The method of claim 1, wherein the first bus comprises a full duplex communication bus, and the second bus comprises a half duplex communication bus.

* * * * *